United States Patent [19]

Anderson

[11] Patent Number: 4,573,862

[45] Date of Patent: Mar. 4, 1986

[54] WORKPIECE TRANSFER DEVICE

[75] Inventor: Paul L. Anderson, Trenton, Mich.

[73] Assignee: Lamb Technicon Corp., Warren, Mich.

[21] Appl. No.: 653,360

[22] Filed: Sep. 24, 1984

[51] Int. Cl.<sup>4</sup> ............................................. B65G 25/04
[52] U.S. Cl. ...................................... 414/753; 294/88; 198/468.2
[58] Field of Search .............................. 901/49, 39, 37; 414/750, 753, 749, 751; 294/88, 116; 198/486, 654

[56] References Cited

U.S. PATENT DOCUMENTS

| | | | |
|---|---|---|---|
| 2,611,493 | 9/1952 | Nordquist | 198/654 X |
| 3,885,825 | 5/1975 | Amberg et al. | 414/753 X |
| 3,944,058 | 3/1976 | Strauss | 294/116 X |
| 4,279,560 | 7/1981 | Ito et al. | 414/753 X |
| 4,473,249 | 9/1984 | Valentine et al. | 294/88 |

*Primary Examiner*—Leslie J. Paperner
*Assistant Examiner*—Darrell G. Dayoan
*Attorney, Agent, or Firm*—Barnes, Kisselle, Raisch, Choate, Whittemore & Hulbert

[57] ABSTRACT

A workpiece transfer device has a carrier which travels on rails between a pick-up station and a delivery station. A pair of parallel tracks extends between the two stations. A workpiece gripper has a roller thereon engaged with one track to retain the work gripper in work-gripping position when the carrier is travelling from the pick-up station to the delivery station. The roller engages the other track to retain the work gripper in the release position when travelling in the opposite direction. At the opposite ends of the two tracks cylinder-operated blocks are arranged to receive the roller from one track and shift it to engage the other track.

11 Claims, 3 Drawing Figures

WORKPIECE TRANSFER DEVICE

This invention relates to a workpiece transfer mechanism.

In many automated manufacturing operations it becomes necessary to deliver a workpiece from one conveyor to another or from a conveyor to a machine or even from one machine to another. In mechanisms for accomplishing such transfer operations the workpieces are frequently lifted vertically at a pickup station, gripped by fingers or tongs on a carrier, moved horizontally along on elevated track and then lowered vertically at the delivery station. The gripping devices are usually powered by air or hydraulics. The problem that frequently arises with such mechanisms is that any power failure during transfer of the workpiece may result in release of the grippers and dropping the workpiece. This is particularly true in transfer devices where grippers are required to hold the workpieces in an elevated position for long periods of time (overnight, for example).

The primary object of the present invention is to provide a mechanism of the type described wherein means are provided for positively retaining the gripper mechanism in the work-gripping position throughout the travel of the work carrier irrespective of a power failure.

A more specific object of the invention is to provide a mechanical interlock between the work gripper and the track along which the carrier travels that is effective to lock the work gripper in the closed, work-gripping position when the carrier is travelling in the direction toward the delivery station and in the open, work-releasing position when the carrier is travelling in the opposite direction.

Other objects, features and advantages of the present invention will become apparent from the following description and accompanying drawings, in which.

Figure 1:
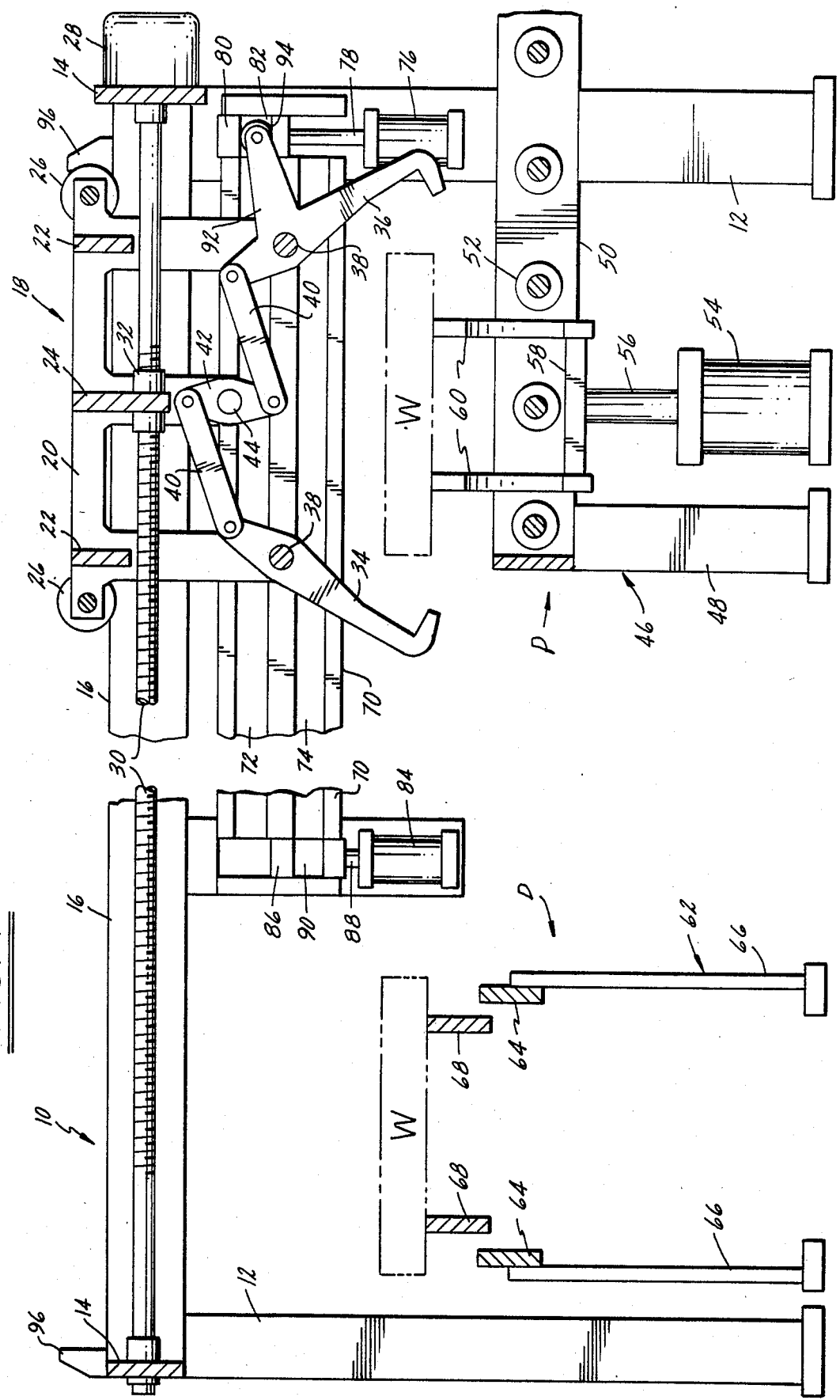
FIG. 1 is a fragmentary longitudinal vertical sectional view of a transfer device according to the present invention, the workpiece carrier being located at the pick-up station.

Referring to FIG. 1 a transfer device according to the present invention comprises a frame generally designated 10 having a pair of laterally spaced upright legs 12 at each end thereof. The legs in each pair 12 are interconnected by cross members 14. A pair of parallel rails 16 extends longitudinally between the upper ends of legs 12 at each end of frame 10. Rails 16 are designed to support a workpiece carrier 18. Carrier 18 comprises a pair of side frames 20 connected by spacers 22,24. Carrier 18 is supported on rails 16 by four wheels 26 and is powered for movement along rails 16 by a motor 28 which drives a screw 30 engaged by a nut 32 on spacer 24.

The workpiece gripping mechanism on the carrier comprises two pair of hooks 34,36 pivotally supported between frames 20 on shafts 38 for swinging movement in vertical planes. The upper ends of the hooks are interconnected for movement in unison by means of links 40 connected to the opposite ends of a lever 42 pivotally supported on the carrier as at 44.

The workpiece gripping mechanism on carrier 18 is designed to pick up a workpiece W at a pick-up station P, carry it horizontally along the rails 16 and deposit the workpiece at a delivery station D. The pick-up station P may comprise one end of a roller conveyor 46 to which the workpieces are delivered. Conveyor 46 has legs 48 supporting a pair of rails 50 between which rollers 52 are journalled. Adjacent the end of the conveyor there is arranged a cylinder 54, the piston rod 56 of which has mounted thereon a plate 58 and a pair of upright risers 60 for elevating a workpiece resting on rollers 52 to the raised position shown in FIG. 1.

At the delivery station D there is a lift and carry conveyor 62 which comprises a pair of fixed horizontally extending rails 64 supported on legs 66 and a pair of vertically shiftable lift bars 68. A suitable mechanism (not illustrated) is also provided for raising and lowering lift bars 68. It will be appreciated that stations P and D are shown merely by way of example. They may vary in construction depending upon the nature of the workpiece and the specific purpose for transferring the workpieces from one station to another.

At one side of frame 10 there is fixedly mounted a horizontally extending rail 70, the inner face of which is grooved to form two horizontally extending tracks 72,74. Tracks 72,74 are spaced apart vertically in parallel relation and lie in the same vertical plane. At the pick-up station P there is arranged a cylinder 76 having a vertically reciprocable piston rod 78. A slide block 80 at the upper end of piston rod 78 is formed with a pocket 82 which, when the piston rod 78 is extended, registers with and forms an extension of the adjacent end of track 72 and which, when the piston rod 78 is retracted, registers with and forms an extension of the adjacent end of track 74. Adjacent the opposite end of rail 70 a second cylinder 84 is fixedly mounted on the frame and has a similar slide block 86 mounted on the upper end of its piston rod 88. Slide block 86 also has a pocket 90 thereon which, when the piston rod 88 is extended, registers with and forms an extension of the adjacent end of track 72 and, when the piston rod is retracted, registers with and forms an extension of the adjacent end of track 74.

One of the hooks 36 on carrier 18 has an integral bellcrank arm 92 with a roller 94 journalled at the free end thereof. Roller 94 is dimensioned to have a rather close fit with tracks 72,74 and pockets 82,90. When carrier 18 is at the pick-up station P roller 94 is trapped in pocket 82 and when the carrier is at the delivery station D roller 94 is trapped in pocket 90. Accordingly, when the carrier is at either end of its path of travel roller 94 is adapted to be shifted vertically by cylinders 76,84 into registration with the adjacent end of either track 72,74. The travel limits of carrier 18 are determined by the stops 96 adjacent the opposite ends of rails 16.

Figure 2:
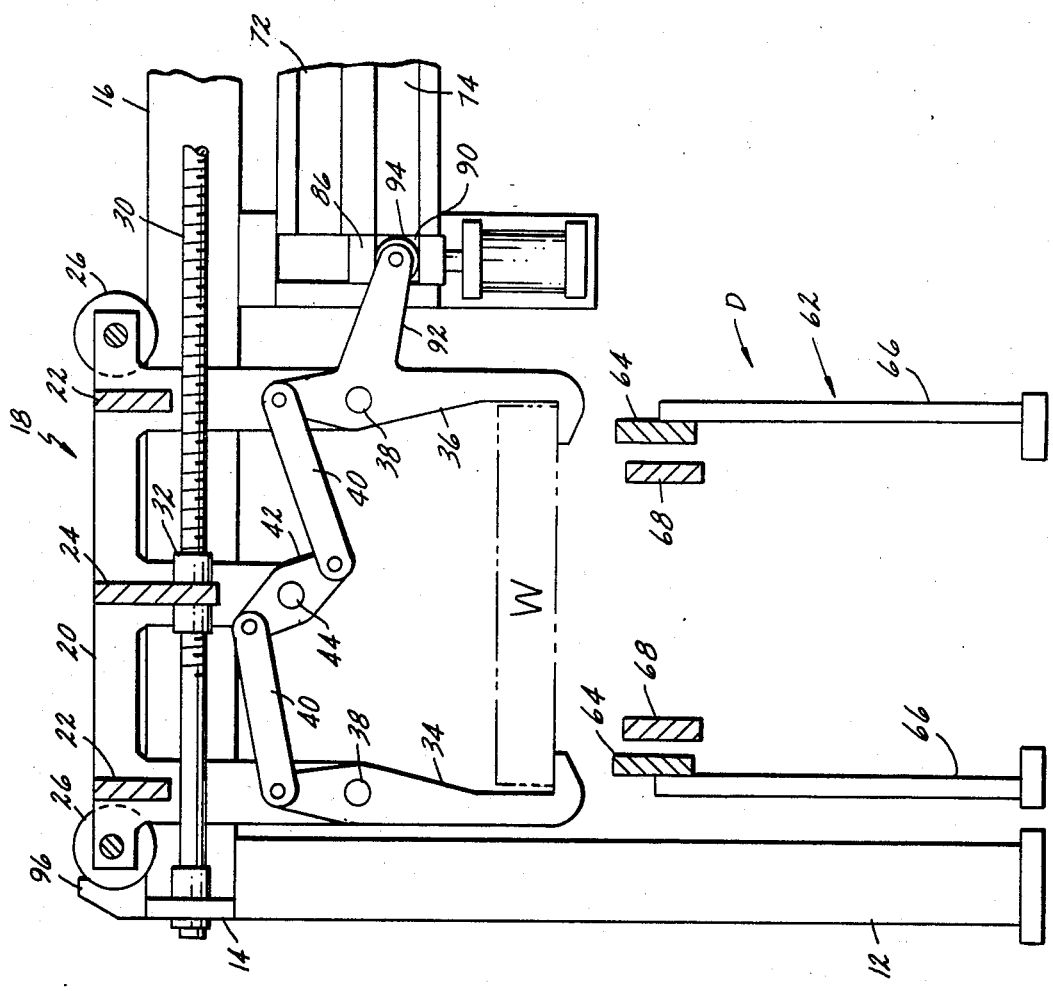
FIG. 2 is a fragmentary sectional view similar to FIG. 1 and showing the carrier at the delivery station.
Figure 3:
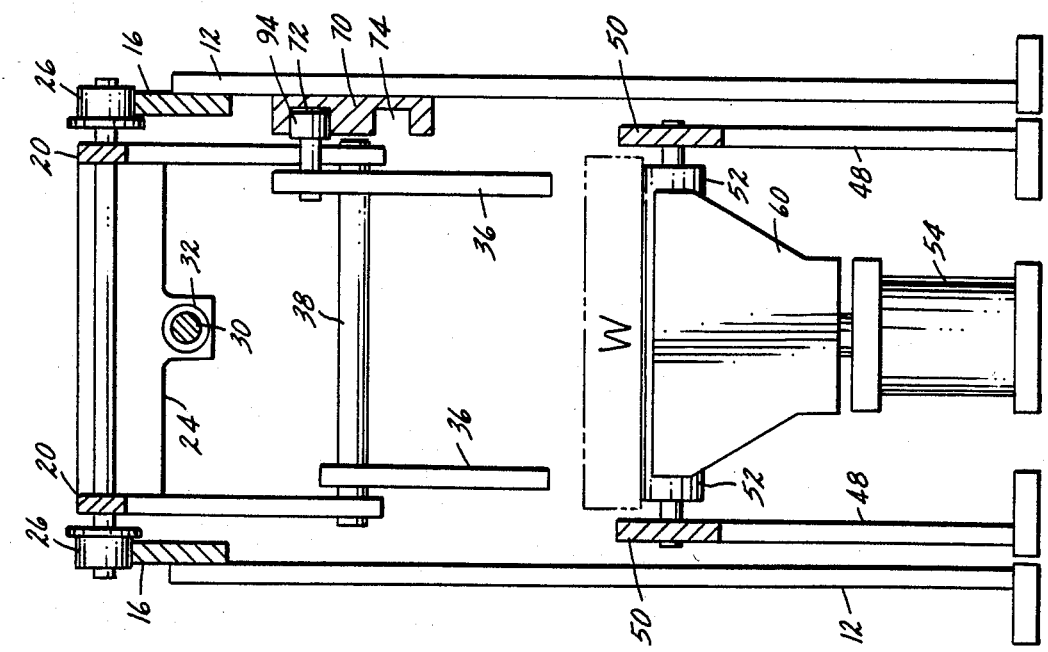
FIG. 3 is a transverse vertical sectional view of the transfer device.

When the carrier 18 is at the pick-up station P as shown in FIG. 1 and the piston rod 78 is extended, the hooks 34,36 are in the open position. At this time cylinder 54 can be actuated to lift the workpiece W to the position shown in broken lines. Thereafter cylinder 76 is actuated to retract rod 78. This displaces slide block 80 downwardly to a position wherein roller 94 aligns with the adjacent end of track 74. The retraction of rod 78 swings the hooks 34,36 inwardly toward each other to engage the workpiece. Thereafter cylinder 54 is actuated to retract rod 56 and thus lower the risers 60 to an out-of-the-way position. Motor 28 is then actuated to advance carrier 18 in a direction to the left toward the delivery station D. During travel of the carrier in this direction roller 94 is trapped in track 74 against vertical displacement and therefore positively retains hooks 34,36 in the closed work-engaging position. When the carrier 18 engages the stop 96 at the other end of rails 16 (FIG. 2) motor 28 is de-energized and the mechanism controlling lift bars 68 is actuated to raise these bars sufficiently to at least slightly lift the workpiece above the lower ends of the hooks 34,36. Cylinder 84 is then actuated to extend its piston rod 88 and thereby shift roller 94 into alignment with the adjacent end of track 72. This causes hooks 34,36 to swing outwardly and thereby release the workpiece. The workpiece is then lowered on bars 68 to clear the lower ends of the hooks. Thereafter, motor 28 is energized to return the carriage to the pick-up station P, during which travel the hooks will be locked in the open position shown in FIG. 1. When the next successive workpiece arrives at the pick-up station the cycle is repeated to transfer the workpiece in the manner described to the delivery station.

I claim:

1. A device for transferring workpieces from a first station to a second station comprising a support, guide means on said support extending between said stations, a workpiece carrier movable on said guide means between said stations, a workpiece gripper on said carrier and movable therewith, means for actuating said gripper to a work gripping position when the carrier is adjacent said first station and thereby grip a workpiece at said first station for transfer to the second station, means for actuating said gripper to a work-releasing position when the carrier reaches the second station to release the workpiece at said second station, a track fixed on said support and extending along a path generally parallel to said guide means, a follower mounted on said carrier for translatory movement therewith, said follower being operatively connected with the work gripper and shiftable by said actuating means between a first position wherein the work gripper is actuated to the work-gripping position and a second position when the work gripper is actuated to the work-releasing position, said follower when in said first position being engagable with said track upon movement of the carrier from said first to said second station and in said second position being disengaged from said track upon movement of the carrier from said second to said first station, said follower being locked against shifting movement when engaged with said track to retain said work gripper in said work gripping position.

2. A transfer device as called for in claim 1 including a second track extending between said stations in apath generally parallel to said first track, said follower when in said second position being engagable with said second track upon movement of the carrier from said second to said first station.

3. A transfer device as called for in claim 1 wherein said work gripper comprises hook means swingable about a horizontal axis on said carrier, said follower being shiftable in a generally vertical path between said first and second positions.

4. A transfer device as called for in claim 1 wherein said actuator means comprises an actuator adjacent each of said stations positioned for operative engagement with the follower as the carrier arrives at the station.

5. A transfer device as called for in claim 1 wherein said actuating means includes a member adjacent the opposite ends of said track adapted to receive the follower as the carrier arrives at said stations, said members being shiftable between first and second positions into alignment with the path of travel of the follower in said first and second positions thereof.

6. A transfer device as called for in claim 1 including a second track extending between said stations along a path generally parallel to the first track, said actuating means comprising an actuator adjacent each station, the actuator adjacent the first station being adapted to shift the follower to a position for engagement with the first track upon arrival of the carrier at the first station and the actuator adjacent the second station being adapted to shift the follower to said second position for engagement with the second track upon arrival of the carrier at the second station.

7. A transfer device as called for in claim 6 wherein each actuator includes a slide adjacent the opposite ends of said tracks, each slide having a pocket therein adapted to receive and retain the follower, each slide being shiftable from a position wherein the pocket registers with the adjacent end of one track to a position wherein the pocket registers with the adjacent end of the other track.

8. A transfer device as called for in claim 7 wherein each actuator includes a cylinder having a reciprocable piston rod, said slides being operatively connected one with each of said piston rods.

9. A transfer device as called for in claim 8 wherein said slides are fixedly mounted on the rods.

10. A transfer device as called for in claim 9 wherein said gripper comprises a pivotally supported hook and said follower is fixedly mounted on said hook.

11. A transfer device as called for in claim 10 wherein said hook is pivoted for swinging movement about a generally horizontal axis, said tracks being spaced apart vertically and said piston rods being reciprocable in a generally vertical direction.

* * * * *